United States Patent Office 3,337,488
Patented Aug. 22, 1967

3,337,488
PROCESS FOR HYDROLYZING ETHYLENE-ALKYL ACRYLATE COPOLYMERS WITH AQUEOUS AMMONIA
Harold D. Lyons, Overland Park, and Joseph C. Davis, De Soto, Kans., assignors to Gulf Oil Corporation, Pittsburgh, Pa., a corporation of Pennsylvania
No Drawing. Filed Jan. 22, 1965, Ser. No. 427,466
2 Claims. (Cl. 260—29.6)

This invention relates to polymers which are soluble in neutral or basic aqueous systems and more particularly to carboxy-substituted polymers derived from copolymers of ethylene.

It is known that although a hydrocarbon polymer such as polyethylene is definitely lipophilic and water-insoluble, that the placing of certain polar substituents on the hydrocarbon polymer chain can effect a complete reversal of character from lipophilic to hydrophilic. For example, polyvinyl pyrrolidone, polyvinyl alcohol, polyacrylamide and polyacrylic acid, which bear hydrophilic substituents on half of the carbon atoms in the polymer chain are so strongly solvated by water that they readily form aqueous solutions. These water soluble polymers are used as adhesives, coating agents, thickening agents, protective colloids and for other purposes. These and other water-soluble polymers exhibit to various degrees emulsifying, bonding, film-forming and thickening properties which are useful in many applications.

The water-soluble polymers described above, although quite useful, have certain shortcomings. For example, although they may readily form films, coatings and adhesive bonds, the resulting products are very sensitive to moisture, as the resins easily go back into aqueous solution. Coatings and wrapping films very often require resistance to water and to moisture vapor transmission. These requirements cannot be met by the common water soluble polymers and for such purposes water insoluble materials must be used.

There is a need for water-soluble polymers which will form films, coatings and adhesive bonds which will resist humid atmospheres and contact with water for limited periods of time but which, if the necessity arises, can be removed with ordinary soap and water or laundering detergents. Such polymers would be particularly desirable for use in sizing and bonding fibrous webs and for use in hair sprays and other cosmetic preparations.

Briefly, we have discovered such a polymer having a hydrocarbon chain structure, about 10 percent to 25 percent of the carbon atoms of said chain having attached thereto substituent groups, of which less than 65 percent are carbalkoxy, from 20 to 100 percent are carbamyl and from about 16 to 80 percent are selected from carboxy and ammonium carboxylate substituents, said polymer having a molecular weight less than about 10,000. This polymer forms films, coatings and strong adhesive bonds which are readily dispersed by alkaline detergent compositions. In fact, under alkaline conditions the polymer itself possesses detergent and antideposition properties. Aqueous solutions of the polymer are transparent and stable at a pH above about 6. Dry films of the polymer resist plain water and neutral or acid aqueous solutions for reasonable periods of time. A fibrous web bonded with the polymer, for example, may be rinsed in plain water and dried without loss of desirable properties.

The most convenient method of manufacturing the novel water-soluble polymers of this invention is to react aqueous ammonia with low molecular weight copolymers of ethylene with alkyl acrylates. Suitable copolymers may be prepared, for example, by copolymerizing ethylene with methyl acrylate in suitable proportions at a pressure between about 15,000 p.s.i. and 25,000 p.s.i. and a temperature between about 180° C. and 260° C. in the presence of a polymerization initiator such as lauroyl peroxide. By adjustment of polymerization conditions, particularly reaction time and initiator concentration, the molecular weight can be controlled within desired limits.

A typical copolymer (employed in Example 6, below) was made in a stirred high pressure reactor of the type ordinarily used for polymerization of ethylene, under the following condition:

Methyl acrylate feed rate—94.9 moles per hour.
Butylaldehyde feed rate—15.2 mole per hour.
Polymerization initiator—diisopropyl peroxydicarbonate.
Ethylene feed rate—sufficient to maintain a pressure of 23,000 p.s.i.g. throughout the course of the polymerization reaction.
Reaction temperature—135° C.

Butyraldehyde was employed in this polymerization so as to assure that the molecular weight would not rise above the desired limits.

So as to obtain the minimum water sensitivity in films made with the final product, it is desirable to have as low a proportion of hydrolyzable ester groups on the polymer chain as possible. However, water solubility cannot be achieved at the same time unless the average molecular weight of the polymer is below about 10,000.

The ethylene-acrylate ester copolymers obtained by the method outlined above are highly uniform in composition and have the polymerized ethylene groups and the polymerized acrylate ester groups randomly distributed throughout the copolymer chains. "Highly uniform" as used above means that when the copolymer is separated into ten percent weight fractions by a column elution technique (as described in J. Polymer Science 31, 453 (1958)) it will contain no ten percent weight fraction which differs in polymerized acrylate ester monomer content by more than about 40 percent from the polymerized acrylate ester content of the whole copolymer. In most cases, the polymerized acrylate ester content of the ten percent weight fractions of the copolymer will differ from the polymerized acrylate ester content of the whole copolymer by less than 20 percent and in many by less than 10 percent.

Below are illustrative examples of the water-soluble polymers of this invention and suitable means for producing them from ethylene-acrylate ester copolymers, as well as examples illustrating various uses for the products so obtained.

*Example I*

To a one-gallon autoclave equipped with a magnetic stirrer were charged the following components:
355 g. of a copolymer of ethylene with methyl acrylate (48.5% by wt. methyl acrylate; number avg. M.W. 5100)
400 ml. of 28% aqueous ammonia
1200 ml. of distilled water The reactor was heated to 200° C. with stirring, held at this temperature for 2 hours and allowed to cool with stirring. This solution was a clear, colorless solution with a Brookfield viscosity of 27,600 c.p.s., and had a total solids content of 17.8 percent. It contained 48 mole percent amide, 47 mole percent acid and 5 mole percent ester based on acrylate content of copolymer.

*Example II*

The same procedure was used in Example I, except that the charge to the autoclave was as follows:

345 g. of the same ethylene-methyl acrylate copolymer as in Example I
300 ml. of 28% aqueous ammonia
1300 ml. distilled water The product was a light tan colored solution containing 17.8 percent solids with a Brookfield viscosity of 11,820 cps. at 26° C.

Analyses indicated 48.5 mole percent of the ester groups were converted to the amide and 52.2 mole percent to the acid form.

Example III

To a one-gallon autoclave equipped with a magnetic stirrer was charged
342 g. of the same ethylene-methylacrylate copolymer used in Example I.
300 ml. of 28% aqueous ammonia
900 ml. of water This mixture was heated 6 hours at 170° C. and was allowed to cool, with stirring.

Total solids in the solution as it came from the reactor was 18.8 percent. The solution was stripped to 30.0 percent solids yielding a clear, colorless solution which had a Brookfield viscosity of 17 cps. at 35° C.

Analysis indicated 20 mole percent of the ester groups were converted to amide and 16.5 mole percent to the acid, leaving 63.5 mole percent in ester form.

Example IV

To a one-gallon autoclave equipped with a magnetic stirrer was charged 365 g. of the same ethylene-methyl acrylate copolymer employed in Example I, 300 ml. 28% aqueous ammonia and 1300 ml. water. The reaction was stirred and heated 6 hours at 295° C. The reaction product had a total solids content of 20.4 percent with a Brookfield viscosity of 42,450 cps. at 26° C. and was a dark colored solution.

Analyses indicated 82 mole percent of the ester groups were converted to amide and 18 percent to the acid.

Example V

To a one-gallon autoclave equipped with a magnetic stirrer was charged 370 g. of the same ethylene-methyl acrylate copolymer employed in Example I, 0.094 g. NaOH, 900 ml. 28% aqueous ammonia and 700 ml. water. This mixture was stirred and heated 6 hours at 240° C. The resulting product was a brown solution of 18.8 percent total solids which was then stripped to a solution of 25.0 percent total solids having a Brookfield viscosity of over 100,000 at 23° C.

Analyses indicated that 0.4 mole percent of the original ester groups were converted to be sodium salt, 97.0 mole percent to the amide and 2.6 mole percent to the acid.

Example VI

To a one-gallon autoclave equipped with a magnetic stirrer was charged 375 g. of an ethylene-methyl acrylate copolymer (53.5% methyl acrylate; av. M.W. 5800), 500 ml. 28% aqueous ammonia and 1100 ml. distilled water. This mixture was stirred and heated 2 hours at 200° C. and was then cooled and removed from the reactor. The prouct was a clear, tan-colored solution of 18.6 percent total solids content with a Brookfield viscosity of 660 cps. at 26° C.

Analyses indicated 94 mole percent of the original ester groups were converted to amide and 6 mole percent to acid.

Example VII

To a one-gallon autoclave equipped with a magnetic stirrer was charged 350 g. of a copolymer of ethylene and methyl methacrylate (42% methyl methacrylate; number avg. M.W. 12,500), 300 ml. 58% aqueous ammonia and 1300 ml. water. This mixture was stirred and heated four hours at 200° C.

No solution formed (solid unreacted polymer remained in the reactor). This example illustrates the type of results to be expected when the molecular weights are above about 10,000.

Example VIII

To a one-gallon autoclave equipped with a magnetic stirrer was charged 365 g. of the ethylene-methyl acrylate copolymer employed in Example VI, 300 ml. aqueous ammonia and 1300 ml. water. This mixture was stirred and heated six hours at 180° C. The product was a tan-colored solution of 18.4 percent solids content and a Brookfield viscosity of over 100,000 cps. at 26° C.

Analysis indicated 39.6 mole percent of the original ester groups were converted to amide and 33 mole percent to acid.

Example IX

To a stirred reactor was charged 10 lb of the copolymer employed in Example VI, 80 lb. water and 6 lb. of 28 percent aqueous ammonia. This mixture was stirred for 2 hours at a temperature of approximately 200° C. The product was a colorless 7.5 percent aqueous solution having a Brookfield viscosity at 26° C. of 32 cps. In a dry form the polymer product was a colorless, flexible transparent thermoplastic solid. Analyses of this product indicated 63 mole percent of the original ester was converted to amide and 21 mole percent to acid. Small samples of this product were tested for use in various applications, as disclosed in the examples which follow.

Example X

Water was stripped from the 7.5 percent aqueous solution of Example IX to yield an aqueous polymer solution of 15.6 percent solids content. To 300 ml. of absolute ethanol was added 100 ml. of 15.6 percent aqueous polymer solution. This mixture was then placed in a pressure bottle and a quatity of propellant (Genetron 22) was added to bring the pressure within the bottle up to 130 p.s.i.g. The pressure bottle was fitted with a valve and a spray nozzle and the mixture was tested as a hair spray formulation. The hair spray was evaluated by practical tests on the hair of volunteers, who indicated their approval of the softness, hair-holding ability and ease of brushing or combing out, as well as ease of removal by washing.

Example XI

Untreated polyethylene bottles were dipped in the aqueous polymer solution prepared in Example I. The bottles were dried both at room temperature and also at 150° C. The coatings on these bottles passed the pressure-sensitive (Scotch) tape test for adhesion. The coated areas on bottles were found to be anti-static when rubbed against a piece of fabric in an effort to build up a static charge. After rubbing, the uncoated portions would pick up cigarette ashes while the coated portions would not.

Example XII

Polypropylene film was coated with the polymer prepared in Example IX. This film lost its ability to build up a static charge. Before coating, the film after rubbing with cloth, would pick up 50 to 100 ash particles at a three-inch distance. After coating, the rubbed film would not pick up ashes at a distance of one inch.

Example XIII

Sheets of paper were coated with approximately 7 pounds per ream of water-soluble polymer, employing the polymer solutions of Examples I, II, VIII and IX, on East Texas Tex Cote paper, using a No. 30 Mayer rod. The coated paper was dried in a forced air oven at 150° C. for two minutes. After drying and cooling, the coated paper was creased and the coating was tested for breaks and pinholes by pouring dyed turpentine on the coated side and then inspecting the uncoated side. The coatings were found to be free of pinholes and were resistant to breakage on creasing. The coatings possessed naturally high gloss, and were heat-sealable.

Example XIV

Coatings were made on sheets of aluminum foil, nylon, polypropylene, polyethylene terephthalate and regenerated cellulose (cellophane) films using the polymer solution of Example IX and a No. 30 Mayer rod. The coatings were dried in a forced air oven at 150° C. All of the coatings were continuous, adherent, glossy, transparent and heat sealable, demonstrating the usefulness of the polymer in coating a variety of substrates.

Example XV

A solution containing approximately 4 percent total solids was prepared by mixing 10.6 g. of the polymer solution produced in Example III with 30 ml. water, 1.0 ml. diethyl sulfate and 0.4 g. of a polyamine salt cross-linking agent (Aerotex 23 Special).

A sheet of polyethylene terephthalate film was laid on a work surface. On top of this was placed a woven nylon screen. An 8 inch square piece of non-woven rayon prebond fabric was laid on top of the nylon screen and was treated with sufficient polymer solution so as to give approximately 30 percent loading with polymer when dry. A second piece of nylon screen was placed on top of the treated non-woven fabric and a piece of polyethylene terephthalate film on top. The entire package was then run through a rubber roll wringer to remove excess liquid, the nylon screen and polyethylene terephthalate film serving to protect the non-woven fabric from tearing during the wringing and assuring even distribution of polymer solution.

The treated square of non-woven fabric was then dried at 150° C. in a forced air oven, was removed and cooled. The non-woven fabric possessed a soft hand, yet the fibers were bonded together firmly so that it resisted stretching and tearing. A four-inch square sample was subjected to a wash test at 80° to 100° C. for 20 minutes in a 2 percent aqueous solution of a heavy duty household laundry detergent. The sample was then rinsed in water, after which excess water was squeezed out and the sample was allowed to dry at room temperature. The laundered sample was found to still possess both a strong bond and a soft hand. It was concluded that a cured polymer bond had been obtained.

To test resistance of the polymer bond to dry cleaning a 1 inch by 5 inch strip was cut from the treated non-woven fabric and was folded in half and immersed to a depth of ½ inch in trichloroethylene for about 5 seconds. The strip was removed and tested manually by pulling on the ends of the strip. The tensile strength of the non-woven fabric did not appear to be affected appreciably by exposure to trichloroethylene.

Example XVI

Polymer solution produced in Example IX was colored with a blue dye (Grasol Blue 2GS) and coatings were made by both dipping and spray techniques on glass, sheets of methyl methacrylate polymer, polyethylene film and polypropylene film. Clear, colored coatings of good optical properties were formed on drying both in air at room temperature and at 150° C. This demonstrates the utility of the water soluble polymers in producing optically clear colored coatings for decorative purposes and for filters, as, for example, on windshields or windows, to reduce glare.

Example XVII

An unbonded mat of glass fibers was wet with the polymer solution of Example III. Excess liquid was removed by squeezing and the mat was dried in a forced air oven at 150° C. for 5 minutes. The sample was removed and cooled. The mat was found to be firmly bonded so that it had characteristics resembling a soft woven fabric.

What is claimed is:

1. A process comprising introducing an ethylene-alkyl acrylate copolymer having a molecular weight of less than about 10,000 into a hydrolysis zone, said ethylene-alkyl acrylate copolymer having a hydrocarbon chain structure wherein about 10 to 25 percent of the carbon atoms having attached thereto substituent groups, introducing aqueous ammonia into said hydrolysis zone and therein contacting said ethylene-alkyl acrylate copolymer, maintaining the temperature of said hydrolysis zone above 170° C., and withdrawing from said hydrolysis zone an ethylene-alkyl acrylate water-soluble polymer having a hydrocarbon chain structure, about 10 percent to 25 percent of the carbon atoms of said chain having attached thereto substituent groups, of which less than 65 percent are carbalkoxy, from 20 to about 97 percent are carbamyl and from about 2.6 to 80 percent are selected from the group consisting of carboxy and ammonium carboxylate substituents, said polymer being water-soluble and having a molecular weight less than about 10,000 and forming a transparent stable solution in water at a pH above about 6, said polymer forming a substantially water-insensitive film.

2. The process of claim 1 wherein said ethylene-alkyl acrylate copolymer introduced into said hydrolysis zone is prepared by copolymerizing ethylene with an alkyl acrylate in a polymerization zone at a pressure above about 15,000 p.s.i., a temperature between about 180° C. and 260° C., said polymerization conducted in the presence of a polymerization initiator.

References Cited

UNITED STATES PATENTS

| | | | |
|---|---|---|---|
| 3,025,219 | 3/1962 | Maeder | 260—33.4 |
| 3,068,151 | 12/1962 | Haefele | 260—33.4 |
| 3,215,488 | 10/1965 | O'Donnell et al. | 260—854 |
| 3,249,570 | 5/1966 | Potts et al. | 260—29.6 |

MURRAY TILLMAN, *Primary Examiner.*

SAMUEL H. BLECH, *Examiner.*

W. J. BRIGGS, *Assistant Examiner.*